United States Patent
Yano et al.

(10) Patent No.: US 9,470,535 B2
(45) Date of Patent: Oct. 18, 2016

(54) CENTER DEVICE, PROGRAM, MAP INFORMATION TRANSMISSION METHOD, AND NAVIGATION DEVICE

(71) Applicant: DENSO CORPORATION, Kariya, Aichi-pref. (JP)

(72) Inventors: Makoto Yano, Chiryu (JP); Motohiro Fukumoto, Nagoya (JP); Hiroyuki Hirano, Anjo (JP); Takamitsu Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/417,266

(22) PCT Filed: Jul. 29, 2013

(86) PCT No.: PCT/JP2013/004579
§ 371 (c)(1),
(2) Date: Jan. 26, 2015

(87) PCT Pub. No.: WO2014/020886
PCT Pub. Date: Feb. 6, 2014

(65) Prior Publication Data
US 2015/0247732 A1  Sep. 3, 2015

(30) Foreign Application Priority Data
Aug. 2, 2012 (JP) ................. 2012-172008

(51) Int. Cl.
*G01C 21/34* (2006.01)
*G01C 21/32* (2006.01)
*G09B 29/10* (2006.01)

(52) U.S. Cl.
CPC ............. *G01C 21/34* (2013.01); *G01C 21/32* (2013.01); *G09B 29/10* (2013.01)

(58) Field of Classification Search
CPC ....... G01C 21/34; G01C 21/32; G09B 29/10
USPC ......................................... 701/533
See application file for complete search history.

(56) References Cited

U.S. PATENT DOCUMENTS

2010/0211305 A1   8/2010  Miyata

FOREIGN PATENT DOCUMENTS

| JP | 2002-303523 A | 10/2002 |
| JP | 2003-315056 A | 11/2003 |
| JP | 2004-077254 A | 3/2004 |
| JP | 2004-125409 A | 4/2004 |
| JP | 4097677 B2 | 3/2008 |

(Continued)

OTHER PUBLICATIONS

Machine Translation of JP 2011-179844 published Sep. 2011.*

(Continued)

*Primary Examiner* — Anne Antonucci
(74) *Attorney, Agent, or Firm* — Posz Law Group, PLC

(57) ABSTRACT

Provided is a center device that enables a navigation device to conduct guidance according to a route on the basis of the latest map information, without imposing a heavy load on a communication network. The center device calculates a guide route as a center route on the basis of the latest of the map information and information received from the navigation device, specifies the map information that is available to the navigation device, and calculates a guide route as a navigation route on the basis of the specified map information and the information received from the navigation device. On the basis of the center route and the navigation route, the center device specifies, from the map information, different map information necessary for the navigation device to give guidance on the center route, and transmits the specified map information to the navigation device.

11 Claims, 7 Drawing Sheets

(56) References Cited

FOREIGN PATENT DOCUMENTS

| JP | 2009-026082 A | 2/2009 |
|---|---|---|
| JP | 2011-007504 A | 1/2011 |
| JP | 2011-179844 A | 9/2011 |
| WO | 2009/078101 A1 | 6/2009 |

OTHER PUBLICATIONS

Machine Translation of JP 2002-303523 published Oct. 2001.*

International Search Report mailed Oct. 29, 2013 in the corresponding PCT application No. PCT/JP2013/004579 (with English translation).

Written Opinion of the International Searching Authority mailed Oct. 29, 2013 in the corresponding PCT application No. PCT/JP2013/004579 (with English translation).

Office Action issued Jan. 5, 2016 in the corresponding JP application No. 2012-172008 (with English translation).

* cited by examiner

CENTER DEVICE, PROGRAM, MAP INFORMATION TRANSMISSION METHOD, AND NAVIGATION DEVICE

CROSS REFERENCE TO RELATED APPLICATIONS

The present disclosure is a U.S. national stage application of PCT/JP2013/004579 filed on Jul. 29, 2013, and is based on Japanese Patent Application No. 2012-172008 filed on Aug. 2, 2012, the contents of which are incorporated herein by reference.

TECHNICAL FIELD

The present disclosure relates to a technology to provide map information via a network.

BACKGROUND ART

Conventionally, there is proposed the prior art in which a vehicular navigation device and a center computer compute a route from the present position to a destination and the navigation device provides guidance according to a route selected by a driver (see Patent Literature 1).

PRIOR ART LITERATURES

Patent Literature

Patent Literature 1: JP-2002-303523A

SUMMARY OF INVENTION

According to the above-mentioned technology, however, map information maintained in the vehicular navigation device may be older than map information maintained in the center computer. In such a case, the navigation device may not appropriately provide a route that is computed by the center computer and is transmitted to the navigation device. For example, suppose a case where the route computed by the center computer may contain a newly opened road. In such a case, the navigation device does not have information about the road and cannot allow the map to display the newly opened road contained in the route received from the center.

Generally, the center computer computes routes based on latest map information. By contrast, the navigation device does not always compute such routes. Obviously, it is preferable that the navigation device could guide a route that is based on the latest map information.

However, a communication network may be highly loaded if the center computer transmits updated countrywide map information to all navigation devices.

The present disclosure has been made in consideration of the foregoing. It is an object of the disclosure to enable a navigation device to guide a route that is based on latest map information without putting a high load on a communication network.

According to a first example of the present disclosure, a center device comprises a map acquisition portion, a first route computation portion, an available map specification portion, a second route computation portion, a transmission map specification portion, and a map transmission portion. The map acquisition portion acquires a plurality of map information. The first route computation portion computes a route from a guidance start point to a guidance end point as a center route based on latest map information out of the plurality of map information acquired by the map acquisition portion and based on information about the guidance start point and the guidance end point received from a navigation device. The available map specification portion specifies map information available to the navigation device from among the plurality of map information acquired by the map acquisition portion. The second route computation portion computes a route from the guidance start point to the guidance end point as a navigation route based on the map information specified by the available map specification portion and based on the information about the guidance start point and the guidance end point received from the navigation device. Based on the center route and the navigation route, the transmission map specification portion specifies difference map information which is a difference between the plurality of map information acquired by the map acquisition portion and which is needed for the navigation device to guide the center route. The map transmission portion transmits the map information specified by the transmission map specification portion to the navigation device.

According to this center device, the navigation device can guide a route comparable to the route computed based on the latest map information available to the center device while minimizing map information transmitted from the center device to the navigation device (restraining a load on the communication network).

According to a first example of the present disclosure, a center device comprises a map acquisition portion, a first route computation portion, an available map specification portion, a transmission map specification portion, and a map transmission portion. The map acquisition portion acquires a plurality of map information. The first route computation portion computes a route from a guidance start point to a guidance end point as a center route based on latest map information out of the plurality of map information acquired by the map acquisition portion and based on information about the guidance start point and the guidance end point received from a navigation device. The available map specification portion specifies map information available to the navigation device from among the plurality of map information acquired by the map acquisition portion. Based on the map information specified by the available map specification portion and the latest map information representing a vicinity of the center route, the transmission map specification portion specifies difference map information which is a difference between the plurality of map information acquired by the map acquisition portion and which is needed for the navigation device to guide the center route. The map transmission portion transmits the map information specified by the transmission map specification portion to the navigation device.

According to this center device, the navigation device can guide a route comparable to the route computed based on the latest map information available to the center device while minimizing map information transmitted from the center device to the navigation device (restraining a load on the communication network).

According to a third example of the present disclosure, a tangible non-transitory storage medium stores a program that causes a computer to function as each portion of the above-mentioned center device. This storage medium can also provide advantages comparable to the above-mentioned advantages.

According to a fourth example of the present disclosure, a navigation device communicating with the above center device comprise a map acquisition portion, a point transmission portion, a map reception portion, a route computation portion, and a route guidance portion. The map acquisition portion acquires map information from a map storage portion storing the map information. The point transmission portion transmits information about the guidance start point and the guidance end point concerning route guidance to the center device. The map reception portion receives the map information from the center device. The route computation portion computes a route from the guidance start point to the guidance end point based on the map information acquired by the map acquisition portion and the map information received by the map reception portion. The route guidance portion provides route guidance based on the map information acquired by the map acquisition portion, the map information received by the map reception portion, and the route computed by the route computation portion.

According to this navigation device, the navigation device can guide a route comparable to the route computed based on the latest map information available to the center device while minimizing map information transmitted from the center device to the navigation device (restraining a load on the communication network).

According to a fifth example of the present disclosure, a map information transmission method performed by one or a plurality of computers comprises a map acquisition step, a first route computation step, an available map specification step, a second route computation step, a transmission map specification step, and a map transmission step. The map acquisition step includes acquiring a plurality of map information. The first route computation step includes computing a route from a guidance start point to a guidance end point as a center route based on latest map information out of the plurality of map information acquired in the map acquisition step and based on information about the guidance start point and the guidance end point received from a navigation device. The available map specification step includes specifying map information available to the navigation device from among the plurality of map information acquired in the map acquisition step. The second route computation step includes computing a route from the guidance start point to the guidance end point as a navigation route based on the map information specified in the available map specification step and the guidance start point and the guidance end point received from the navigation device. The transmission map specification step includes, based on the center route and the navigation route, specifying difference map information that is a difference between the plurality of map information acquired in the map acquisition step and is needed for the navigation device to guide the center route. The map transmission step includes transmitting the map information specified in the transmission map specification step to the navigation device.

According to this map information transmission method, the navigation device can guide a route comparable to the route computed based on the latest map information available to the center device while minimizing map information transmitted to the navigation device (restraining a load on the communication network).

According to a sixth example of the present disclosure, a map information transmission method performed by one or a plurality of computers comprises a map acquisition step, a first route computation step, an available map specification step, a transmission map specification step, and a map transmission step. The map acquisition step includes acquiring a plurality of map information. The first route computation step includes computing a route from a guidance start point to a guidance end point as a center route based on latest map information out of the plurality of map information acquired in the map acquisition step and based on information about the guidance start point and the guidance end point received from a navigation device. The available map specification step includes specifying map information available to the navigation device from among the plurality of map information acquired in the map acquisition step. The transmission map specification step includes, based on the map information specified in the available map specification step and the latest map information representing a vicinity of the center route, specifying difference map information that is a difference between the plurality of map information acquired in the map acquisition step and is needed for the navigation device to guide the center route. The map transmission step includes transmitting map information specified in the transmission map specification step to the navigation device.

According to this map information transmission method, the navigation device can guide a route comparable to the route computed based on the latest map information available to the center device while minimizing map information transmitted to the navigation device (restraining a load on the communication network).

BRIEF DESCRIPTION OF DRAWINGS

The foregoing and other objects, features and advantages of the present disclosure will become more apparent from the detailed description given below with reference to the accompanying drawings in which.

EMBODIMENTS FOR CARRYING OUT INVENTION

Embodiments of the present disclosure will be described in further detail with reference to the accompanying drawings. The disclosure is not limited to the embodiments to be described below but may cover all embodiments belonging to the technological scope of the disclosure. Compatible configurations of the embodiments may be combined.

(Description of Configurations)

Figure 1:
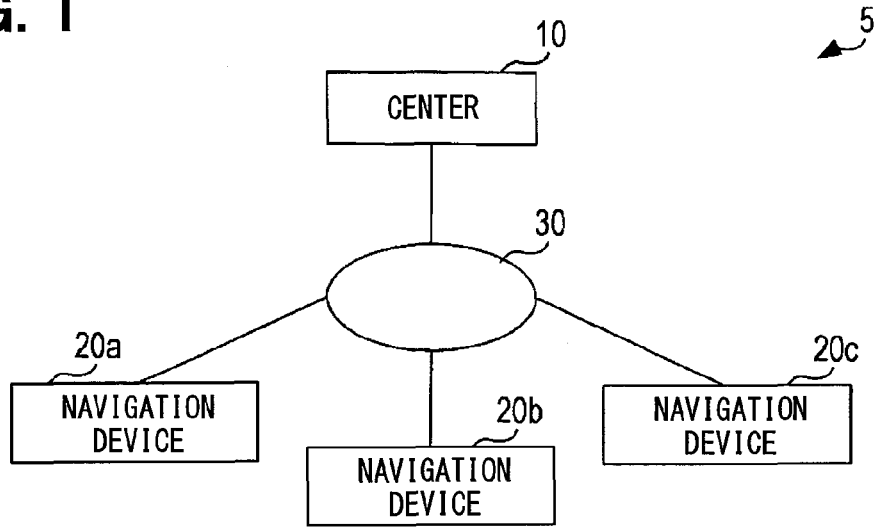
FIG. 1 is an explanatory diagram schematically illustrating a configuration of a navigation system.

As illustrated in FIG. 1, a navigation system 5 according to an embodiment includes a center device 10, navigation devices 20a, 20b, and 20c, and a communication network 30.

(1) Center Device 10

Figure 2:
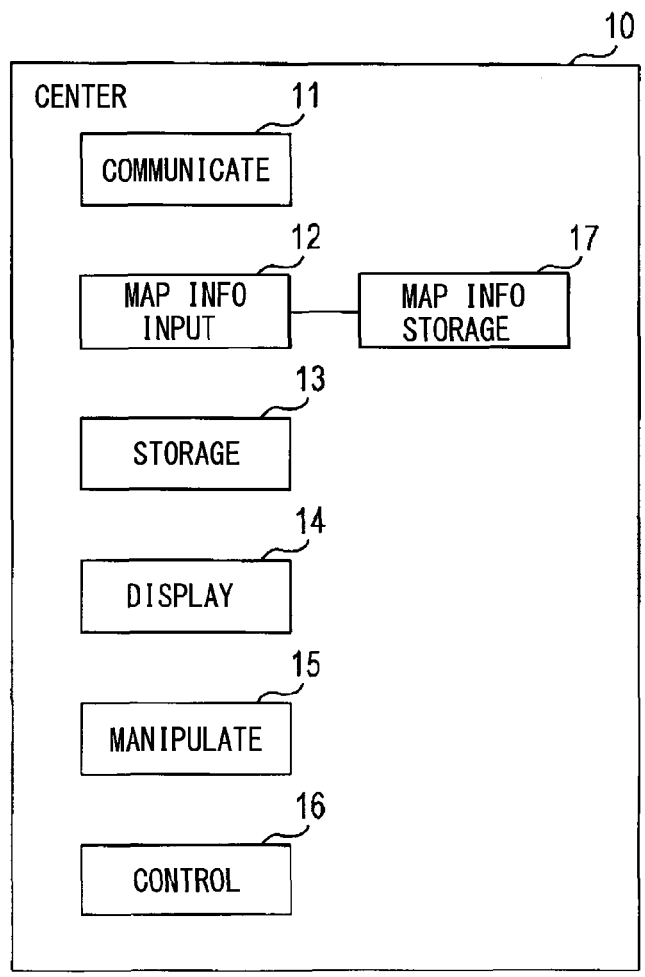
FIG. 2 is an explanatory diagram schematically illustrating a configuration of a center device.

The center device 10 is provided as a known computer and is also referred to as a server, for example. As illustrated in FIG. 2, the center device 10 includes a communication portion 11, a map information input portion 12, a map information storage portion 17, a storage portion 13, a display portion 14, a manipulation portion 15, and a control portion 16. The center device 10 is installed at a data center. A manager of the navigation system 5 manages the center device 10.

The communication portion 11 includes a known communication device and communicates with the navigation device 20 via the communication network 30.

The map information input portion 12 is provided as an input interface and is supplied with map information from the map information storage portion 17.

The map information storage portion 17 includes a nonvolatile storage medium such as a hard disk or an SSD. The map information storage portion 17 stores map information such as node data, link data, lane data, traffic regulation data, and facility data. The map information storage portion 17 stores not only the latest map information but also old map information that is likely to be maintained in the navigation device 20.

The storage portion 13 includes a nonvolatile storage medium such as an SSD and stores a program executed by the control portion 16 and various data needed to execute the program.

The display portion 14 includes a display device such as a liquid crystal display and is capable of visually displaying a result of execution of a program by the control portion 16.

The manipulation portion 15 includes a known manipulation device such as a keyboard or a mouse and accepts a manipulation instruction from a manager.

The control portion 16 includes electronic circuits such as a known CPU, RAM, and bus. The control portion 16 reads a program stored in the storage portion 13 into the RAM and allows the CPU to execute the program and thereby performs various processes.

(2) Navigation Devices 20a, 20b, and 20c

The navigation devices 20a, 20b, and 20c are each provided as a vehicle-mounted computer or a portable computer. FIG. 1 illustrates three navigation devices 20a, 20b, and 20c, but the number of the navigation devices is not limited to three. As many navigation devices as needed are available. In the description below, the navigation device 20 represents the three navigation devices 20a, 20b, and 20c.

Figure 3:
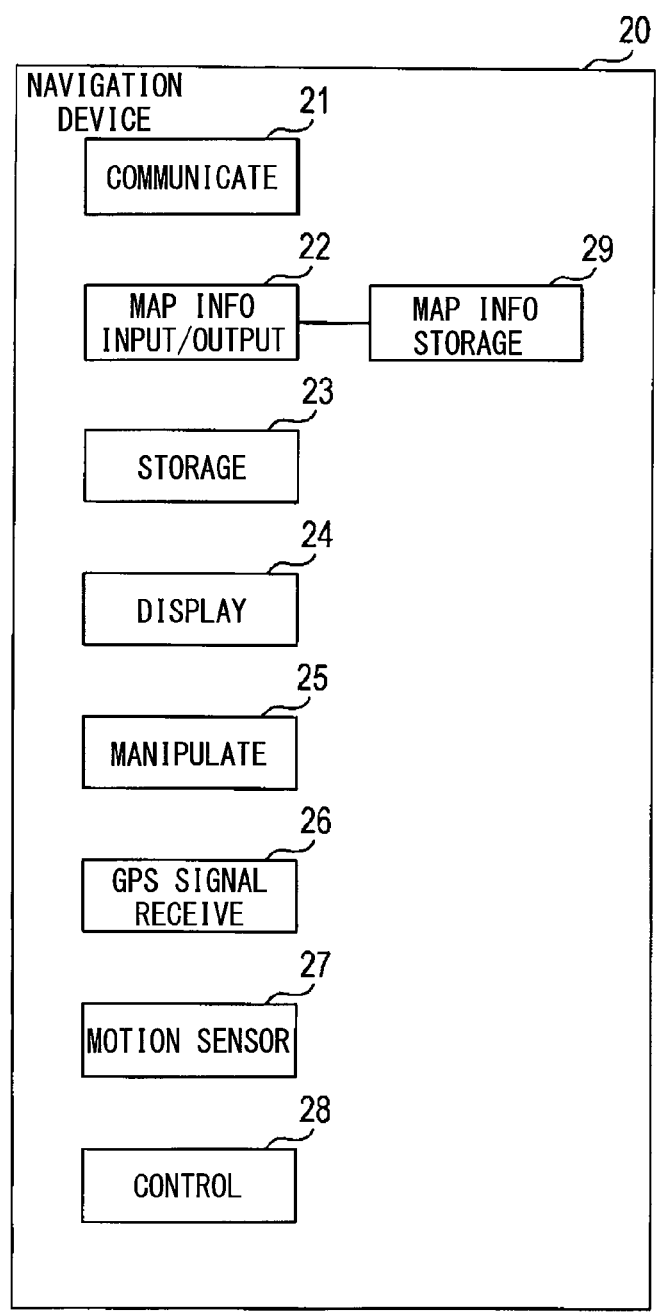
FIG. 3 is an explanatory diagram schematically illustrating a navigation device.

As illustrated in FIG. 3, the navigation device 20 includes a communication portion 21, a map information input/output portion 22, a map information storage portion 29, a storage portion 23, a display portion 24, a manipulation portion 25, a GPS signal reception portion 26, a motion sensor 27, and a control portion 28.

The communication portion 11 includes a known communication device and communicates with the center device 10 via the communication network 30.

The map information input/output portion 22 is provided as an input/output interface. The map information input/output portion 22 is supplied with map information from the map information storage portion 29 and outputs map information to the map information storage portion 29.

The map information storage portion 29 includes a nonvolatile storage medium such as a hard disk or an SSD. The map information storage portion 29 stores map information such as node data, link data, lane data, traffic regulation data, and facility data. The map information storage portion 29 does not always store the latest map information and may store old map information. Map information transmitted from the center device 10 updates the map information stored in the map information storage portion 29.

The storage portion 23 includes a nonvolatile storage medium such as a hard disk or an SSD and stores a program executed by the control portion 28 and various data needed to execute the program.

The display portion 24 includes a display device such as a liquid crystal display and is capable of visually displaying a result of execution of a program by the control portion 28.

The manipulation portion 25 includes a touch panel integrated or overlapped with the display portion 24 or a mechanical key switch placed near the display portion 24. The manipulation portion 25 accepts a manipulation instruction from a user of the navigation device 20.

The GPS signal reception portion 26 includes an antenna to receive a signal from a GPS satellite and a microcomputer to compute the present position based on the signal received from the antenna. The GPS signal reception portion 26 outputs information indicating the computed present position to the control portion 28 at a specified frequency (e.g., once a second).

The motion sensor 27 includes an acceleration sensor or a gyroscope. The motion sensor 27 measures an acceleration or a torque applied to the navigation device 20 and outputs a measurement value to the control portion 28 at a specified frequency (e.g., once a second).

The control portion 28 includes electronic circuits such as a known CPU, RAM, and bus. The control portion 28 reads a program stored in the storage portion 23 into the RAM and allows the CPU to execute the program and thereby performs various processes.

(3) Communication Network 30

The communication network 30 is provided as a data communication network such as the Internet and is capable of wireless or wired connection.

(Description of Operation According to the First Embodiment)

The following describes operation of the navigation system 5 mainly according to two embodiments. Both embodiments are equal to each other regarding the above-mentioned configuration.

First, the following describes operations of the navigation system 5 according to the first embodiment. The description below covers only operations concerning the present disclosure and omits destination setting or route guidance after the route computation already known as operations of an ordinary navigation device.

(1) Map Information Reception Process

Figure 4:
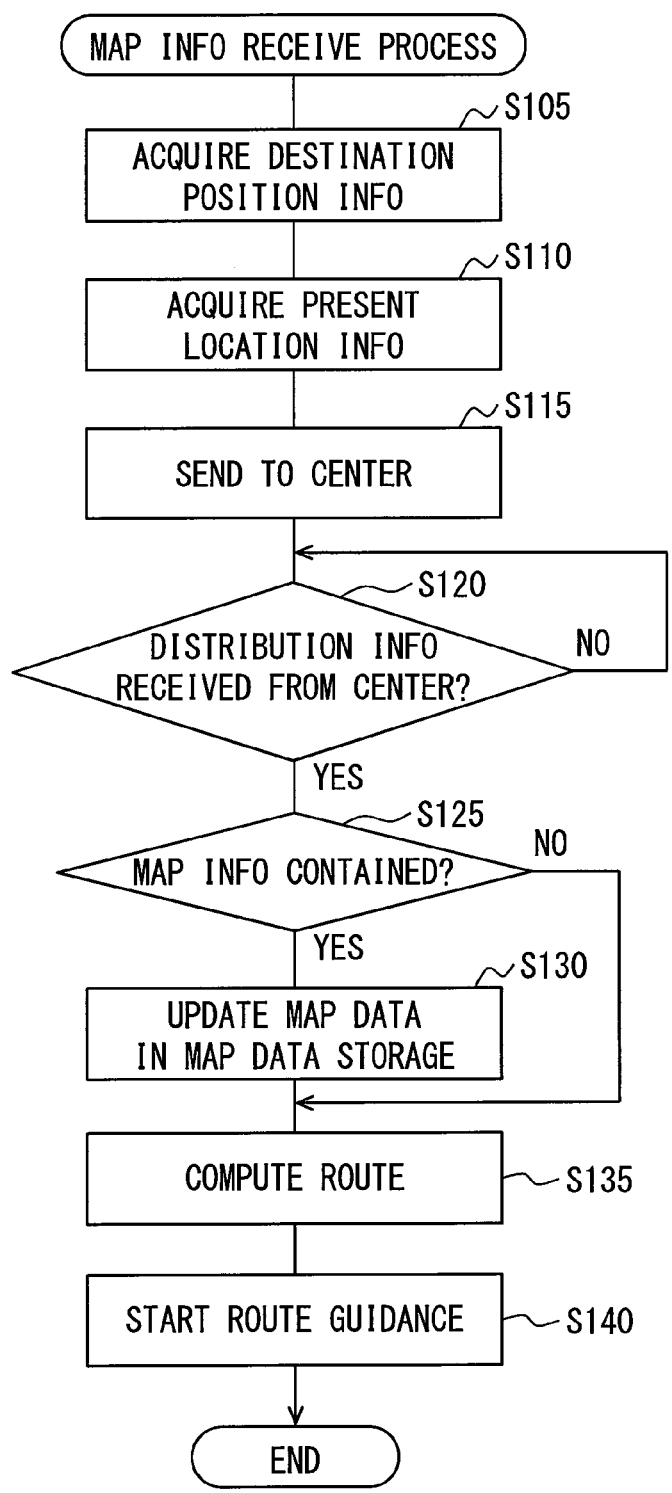
FIG. 4 is a flowchart illustrating a map information reception process performed by the navigation device.

The control portion 28 of the navigation device 20 performs a map information reception process based on a program stored in the storage portion 23. The control portion 28 of the navigation device 20 settles a destination based on a manipulation instruction received from a user via the manipulation portion 25 and then starts the map information reception process. The map information reception process will be described below with reference to FIG. 4.

The control portion 28 of the navigation device 20 starts performing the map information reception process to acquire destination position information (S105). The destination position information is acquired by a destination setting program that is executed before the map information reception process. The destination position information provides a latitude and a route, for example.

The control portion 28 allows the GPS signal reception portion 26 to acquire the present location information (S110). The present location position information provides a latitude and a route, for example.

The control portion 28 transmits the destination position information and the present location position information to the center device 10 via the communication portion 21 (S115). In addition to these pieces of information, the control portion 28 also transmits information that enables the center device 10 to specify the map information maintained in the navigation device 20 and provides an identification number of the navigation device 20, a maintained map partition ID, or map version information, for example.

The control portion 28 determines whether or not distribution information is received from the center device 10 via the communication portion 21 (S120). The distribution information includes information resulting from processing on the center device 10 based on the information transmitted at S115. The distribution information may contain the map information or may instead contain information indicating that there is no map information to be distributed. In this case, the map information is update on the map information stored in the map information storage portion 29 of the navigation device 20.

At S120, the control portion 28 may determine that the distribution information is received from the center device 10 (Yes at S120). In this case, the control portion 28 advances the process to S125. The control portion 28 may determine that no distribution information is received from the center device 10 (No at S120). In this case, the control portion 28 remains at S120.

The control portion 28 proceeds to S125 when determining that the distribution information is received from the center device 10. At S125, the control portion 28 determines whether or not the distribution information received at S120 contains the map information. At S125, the control portion 28 may determine that the distribution information contains the map information (Yes at S125). In this case, the control portion 28 advances the process to S130. The control portion 28 may determine that the distribution information contains no map information (No at S125). In this case, the control portion 28 advances the process to S135.

The control portion 28 proceeds to S130 when determining that the received distribution information contains the map information. At S130, the control portion 28 updates the map information stored in the map information storage portion 29 based on the map information contained in the distribution information. The control portion 28 then advances the process to S135.

At S135, the control portion 28 computes a route from the present position based on the position information acquired from the GPS signal reception portion 26 to the destination based on the position information acquired at S105 based on the map information stored in the map information storage portion 29.

At S140, the control portion 28 starts the guidance (route guidance) based on the route computed at S135. To start the route guidance, the control portion 28 reads and executes a program to provide the route guidance from the storage portion 23.

(2) First Map Information Transmission Process

Figure 5:
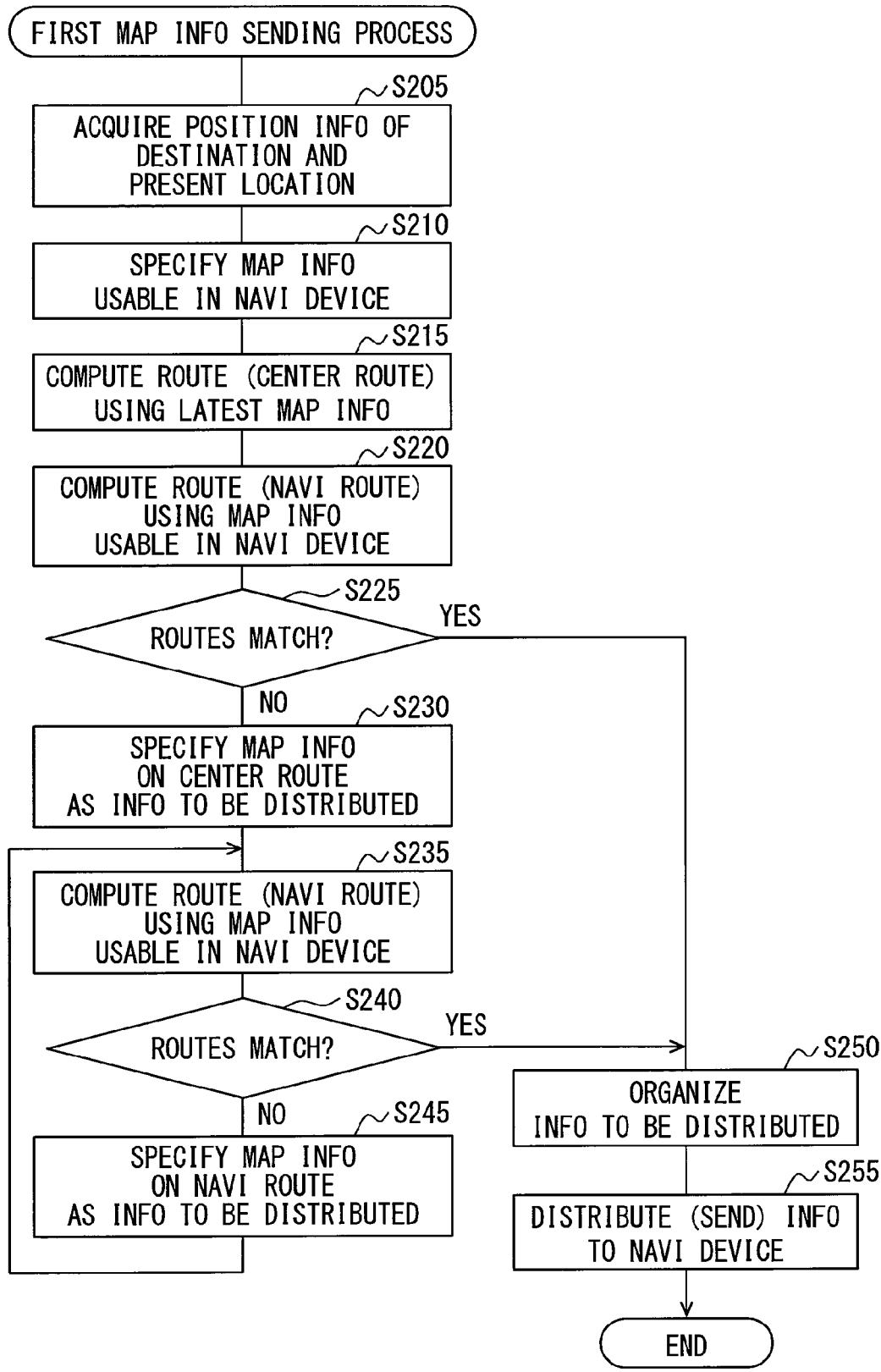
FIG. 5 is a flowchart illustrating a first map information transmission process performed by the center device.

With reference to FIG. 5, the following describes the first map information transmission process performed by the center device 10. When the communication portion 21 receives the position information about the destination and the present location from the navigation device 20, the control portion 16 of the center device 10 starts performing the first map information transmission process based on a program stored in the storage portion 13. The control portion 16 starts performing the first map information transmission process each time the control portion 16 receives the position information about the destination and the present location from the navigation device 20. When receiving the position information about the destination and the present location from the several navigation devices 20, the control portion 16 performs the first map information transmission processes corresponding to the navigation devices 20 in parallel.

The control portion 16 of the center device 10 starts performing the first map information transmission process and acquires the position information about the destination and the present location from the communication portion 21 (S205).

The control portion 16 then specifies the map information maintained in the navigation device 20 based on information that is attached to the position information about the destination and the present location and is capable of specifying the map information maintained in the navigation device 20 (S210). As a specification method, for example, suppose that the storage portion 13 stores a unique number of the navigation device 20 associated with all map partition IDs maintained in the navigation device 20. The unique number of the navigation device 20 is transmitted from the navigation device 20 and is used as a key to retrieve the storage portion 13 and specify the map partition ID maintained in the navigation device 20.

The control portion 16 then computes a center route, namely, a route from the position corresponding to the position information about the present location received at S205 to the position corresponding to the destination position information, based on the latest map information stored in the center device 10 (S215).

The control portion 16 computes a navigation route, namely, a route from the position corresponding to the position information about the present location received at S205 to the position corresponding to the destination position information, based on the map information specified at S210 (S220).

The control portion 16 determines whether or not the center route computed at S215 matches the navigation route computed at S220 (S225). The control portion 16 advances the process to S250 if it is determined that the center route and the navigation route match (Yes at S225). The control portion 16 advances the process to S230 if it is determined that the center route and the navigation route do not match (No at S225).

Figure 6A:
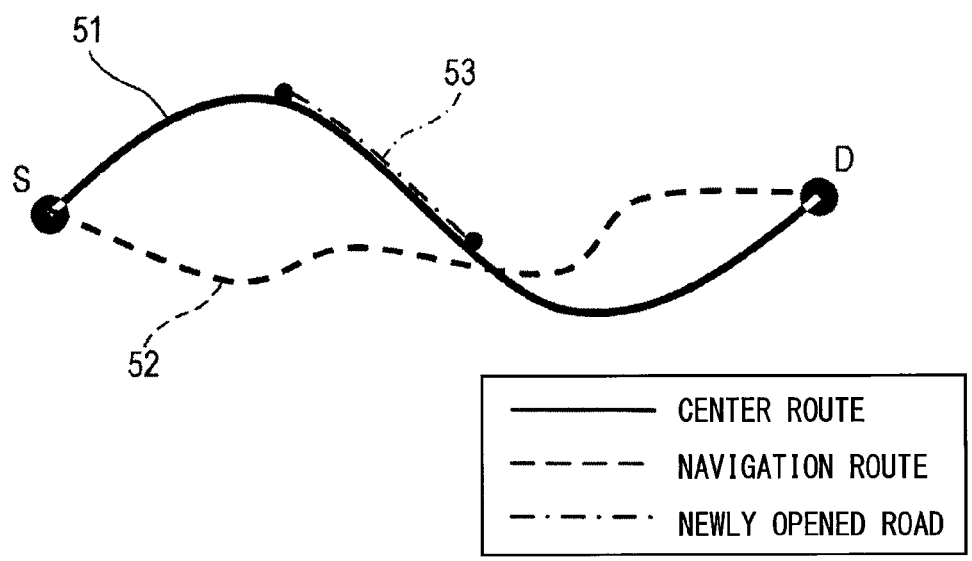
FIG. 6A is an explanatory diagram illustrating an example of map information specified as information to be distributed to the navigation device.

The control portion 16 proceeds to S230 when determining that the center route and the navigation route do not match. At S230, the control portion 16 specifies the map information about the center route as information to be distributed to the navigation device 20. Specifically, the control portion 16 specifies a newly opened road (a road not maintained in the navigation device 20) contained in the center route or a map partition containing the center route. An example will be described with reference to FIG. 6A.

A solid-line route 51 represents the center route. A broken-line route 52 represents the navigation route. A dash-dot line 53 represents a road (link sequence) on the center route. A newly opened road (a road not maintained in the navigation device 20) specifies road information corresponding to the dash-dot line 53 as information to be distributed to the navigation device 20. A map partition containing the dash-dot line 53 may be specified as the information to be distributed.

Returning to FIG. 5, the control portion 16 re-computes the navigation route (S235). Namely, the control portion 16 computes a route from the position corresponding to the position information about the present location received at S205 to the position corresponding to the destination position information by adding the map information specified at S210 and the map information specified at S230.

The control portion 16 determines whether or not the center route computed at S215 matches the navigation route re-computed at S235 (S240). The control portion 16 advances the process to S250 if it is determined that the center route and the navigation route match (Yes at S240). The control portion 16 advances the process to S245 if it is determined that the center route and the navigation route do not match (No at S240).

The control portion 16 proceeds to S245 when determining that the center route and the navigation route do not match. At S245, the control portion 16 specifies the map information about the navigation route as the information to be distributed to the navigation device 20. For example, the information to be distributed may include road information (removed road information) that is absent in information on roads constituting the navigation road but contained in latest map information used by the center device 10 to compute the center route, information about an attribute (e.g., one-way traffic or the number of lanes) that is absent in the information on roads constituting the navigation road but is present the latest map information used by the center device 10 to compute the center route, or road information about a regulation (e.g., closure or one-side alternate traffic) that is absent in the information on roads constituting the navigation road but is present in the latest map information used by the center device 10 to compute the center route.

Figure 6B:
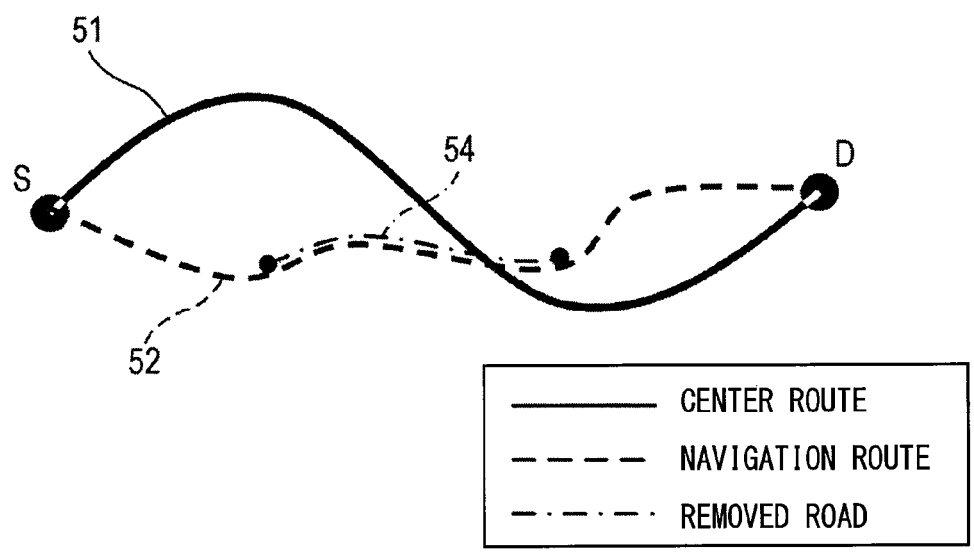
FIG. 6B is an explanatory diagram illustrating another example of map information specified as information to be distributed to the navigation device.
Figure 7A:
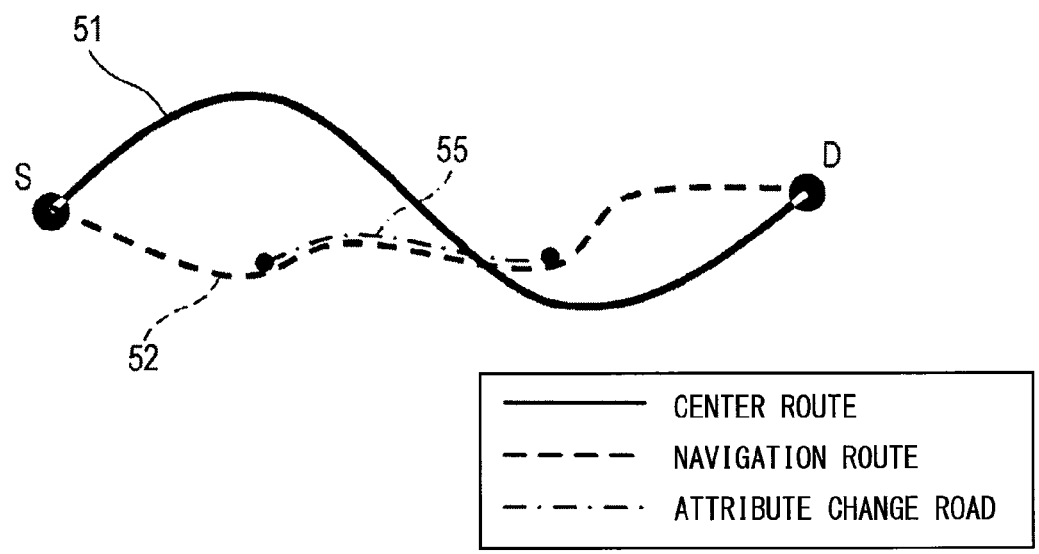
FIG. 7A is an explanatory diagram illustrating still another example of map information specified as information to be distributed to the navigation device.
Figure 7B:
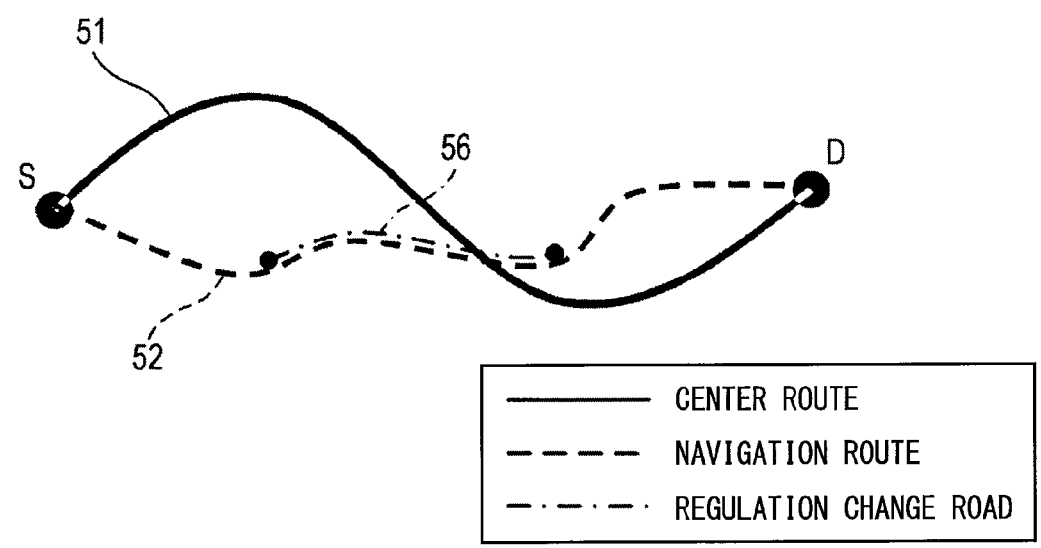
FIG. 7B is an explanatory diagram illustrating yet another example of map information specified as information to be distributed to the navigation device.

FIGS. 6B, 7A, and 7B are described below.

In FIG. 6B, the solid-line route 51 represents the center route. The broken-line route 52 represents the navigation route. A dash-dot line 54 represents a road (link sequence) on the navigation route and also a removed road (a road unavailable on the latest map used for the center device 10 to compute the center route). In this case, the road information corresponding to the dash-dot line 54 is specified as the information to be distributed to the navigation device 20. A map partition containing the dash-dot line 54 may be specified as the information to be distributed.

In FIG. 7A, the solid-line route 51 represents the center route. The broken-line route 52 represents the navigation route. A dash-dot line 55 represents a road (link sequence) on the navigation route and also an attribute change road (a road whose attribute such as one-way traffic or the number of lanes is changed). In this case, the road information corresponding to the dash-dot line 55 is specified as the information to be distributed to the navigation device 20. A map partition containing the dash-dot line 55 may be specified as the information to be distributed.

In FIG. 7B, the solid-line route 51 represents the center route. The broken-line route 52 represents the navigation route. A dash-dot line 56 represents a road (link sequence) on the navigation route and also a regulation change road (a road whose regulation such as closure or one-side alternate traffic is changed). In this case, the road information corresponding to the dash-dot line 56 is specified as the information to be distributed to the navigation device 20. A map partition containing the dash-dot line 56 may be specified as the information to be distributed.

Returning to FIG. 5, the control portion 16 completes S245 and then proceeds to S235. The control portion 16 re-computes the navigation route (S235), determines whether or not the center route and the navigation route match (S240), and repeats S245 and S235 until the center route and the navigation route match.

The control portion 16 proceeds to S250 when determining that the center route and the navigation route match. At S250, the control portion 16 organizes the information to be distributed to the navigation device 20. Specifically, the control portion 16 edits the map information hitherto specified as distribution targets (the map information specified as distribution targets at S230 and S245) into a data format for transmission. Obviously, in some cases, no distribution target is present. In this case, the control portion 16 transmits information indicating that map information as a distribution target is absent.

The control portion 16 allows the communication portion 11 to transmit the distribution information, namely, the information organized as a distribution target at S250, to the navigation device 20. The control portion 16 then terminates the process (the first map information transmission process).

(Advantages of the first embodiment)

There has been described the navigation system 5 according to the first embodiment. According to the center device 10, the navigation device 20 can guide a route comparable to the route computed by the center device 10 based on the latest available map information while minimizing map information transmitted from the center device 10 to the navigation device 20 (while minimizing a load on the communication network 30).

Concerning selection of the map information transmitted from the center device 10 to the navigation device 20, the center device 10 first selects map information corresponding to a difference in the center route from the navigation route. The center route and the navigation route may not match yet even after the center device 10 re-computes the navigation route by adding the selected map information. In such a case, the center device 10 selects map information corresponding to a difference in the navigation route from the center route. The center device 10 thereafter repeatedly re-computes the navigation route and selects map information corresponding to a difference in the navigation route from the center route until the center route and the navigation route match. The center device 10 can efficiently select map information to be transmitted to the navigation device 20.

(Description of Operation According to the Second Embodiment)

The following describes operation of the navigation system 5 according to the second embodiment. The following mainly describes operations different from the first embodiment and omits a description of the same operation as the first embodiment. The navigation system 5 according to the second embodiment differs from the first embodiment in the map information transmission process performed by the center device 10.

The following describes the second map information transmission process performed by the control portion 16 of the center device 10 according to the second embodiment. When the communication portion 21 receives the position information about the destination and the present location from the navigation device 20, the control portion 16 of the center device 10 starts performing the second map information transmission process based on a program stored in the storage portion 13. The control portion 16 starts performing the second map information transmission process each time the control portion 16 receives the position information about the destination and the present location from the navigation device 20. When receiving the position information about the destination and the present location from the several navigation devices 20, the control portion 16 performs the second map information transmission processes corresponding to the navigation devices 20 in parallel.

The control portion 16 of the center device 10 starts performing the second map information transmission process and acquires the position information about the destination and the present location from the communication portion 21 (S305).

The control portion 16 then specifies the map information maintained in the navigation device 20 based on information that is attached to the position information about the destination and the present location and is capable of specifying the map information maintained in the navigation device 20 (S310). As a specification method, for example, suppose that the storage portion 13 stores a unique ID of the navigation device 20 associated with all map partition IDs maintained in the navigation device 20. The unique ID of the navigation device 20 is transmitted from the navigation device 20 and is used as a key to retrieve the storage portion 13 and specify the map partition ID maintained in the navigation device 20.

The control portion 16 then computes a center route, namely, a route from the position corresponding to the position information about the present location received at S305 to the position corresponding to the destination position information, based on the latest map information stored in the center device 10 (S315).

The control portion 16 specifies difference map information by comparing the map information specified at S310 and maintained in the navigation device 20 with the latest map information that is stored in the map information storage portion 17 of the center device 10 and is computed at S315 in the vicinity of the center route (S320). The vicinity of the center route may signify a map partition including the center route or a range of a specified distance from the center route. The information to be specified may relate to a newly opened road, a removed road, a change in the attribute (one-way traffic or the number of lanes), or a change in the regulation (closure or one-side alternate traffic).

The control portion 16 edits the map information specified at S320 into the data format for transmission and then allows the communication portion 11 to transmit the map information as the distribution information to the navigation device 20 (S325). The control portion 16 terminates the process (the second map information transmission process).

(Advantages of the Second Embodiment)

There has been described the navigation system 5 according to the second embodiment. According to the center device 10, the navigation device 20 can guide a route comparable to the route computed by the center device 10 based on the latest available map information while minimizing map information transmitted from the center device 10 to the navigation device 20 (restraining a load on the communication network 30).

(Other Embodiments)

(1) The center device 10 includes one computer in the navigation system 5 according to the above-mentioned embodiments. However, the center device 10 may include several computers. Operations performed by the center device 10 may be assigned to the computers. The computers need not be placed at one location but may be placed at different locations. The navigation device 20 may perform part of operations performed by the center device 10.

(2) The navigation system 5 according to the above-mentioned embodiments computes one optimal route as the center route. However, multiple routes may be computed. For example, multiple routes may be computed according to conditions to compute routes such as a route giving preference to toll roads, a route giving preference to general roads, and a route giving preference to distances. In such a case, a process comparable to the above-mentioned process may be performed on each of the routes.

(3) According to the above-mentioned embodiments, the navigation device 20 provides route guidance according to a route computed by the navigation device 20 itself. However, the navigation device 20 may not compute a route and may provide route guidance according to a route received from the center device 10.

Figure 8:
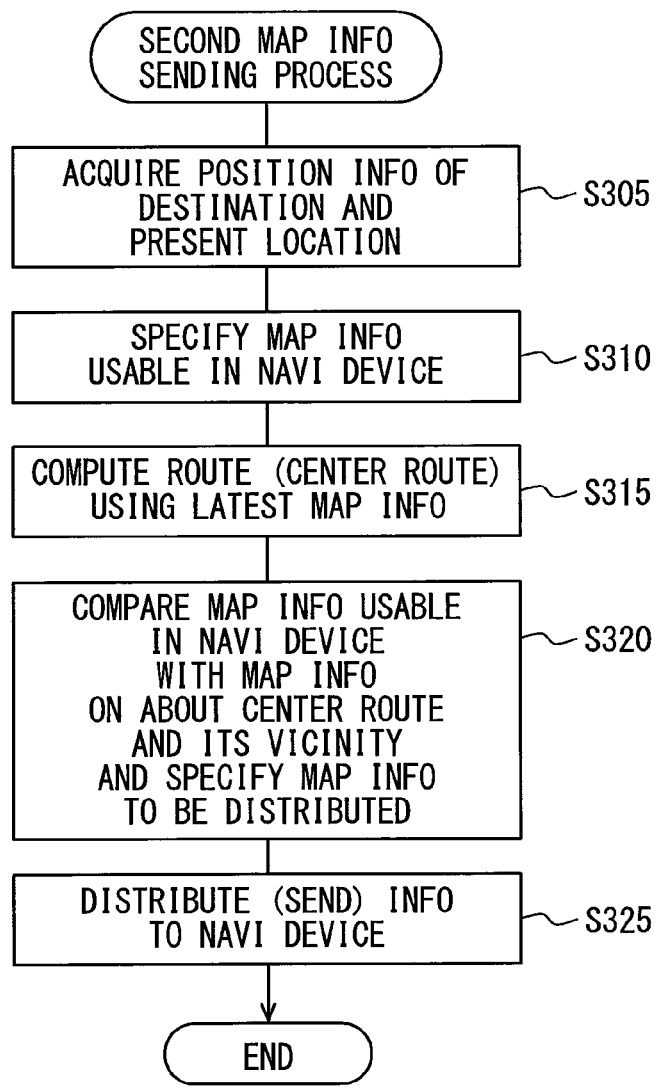
FIG. 8 is a flowchart illustrating a second map information transmission process performed by the center device.

For example, at S250, the first map information transmission process (FIG. 5) performed by the center device 10 transmits the information about the center route computed at S215 (or the navigation route computed at S220) along with the map information to the navigation device 20. At S235, the second map information transmission process (FIG. 8) performed by the center device 10 transmits the information about the route computed at S315 along with the map information to the navigation device 20.

At S135, the map information reception process (FIG. 4) performed by the navigation device 20 does not compute a route. At S145, the map information reception process starts the route guidance using the route information contained in the distribution information received from the center device 10.

These can produce advantages comparable to the above-mentioned embodiments. The navigation device 20 need not compute a route. The corresponding function of the navigation device 20 can be eliminated.

(4) The above-mentioned embodiments specify a newly opened road, a removed road, a change in the attribute (one-way traffic or the number of lanes), or a change in the regulation (closure or one-side alternate traffic) as the difference map information. Moreover, traffic congestion information may be specified as the difference map information. This enables to compute a route in association with the traffic congestion information and allow a user to more conveniently use the navigation device 20.

In the above-mentioned embodiments, the map information input portion 12 of the center device 10 can correspond to an example of a map acquisition portion (or means) in the center device 10. The control portion 16 to perform S215 and S315 can correspond to an example of a first route computation portion (or means).

The control portion 16 to perform S210 and S310 can correspond to an example of an available map specification portion (or means). The control portion 16 to perform S220 can correspond to an example of a second route computation portion (or means). The control portion 16 to perform S230, S245, and S320 can correspond to an example of a transmission map specification portion (or means). The control portion 16 to perform S255 and S325 can correspond to an example of a map transmission portion (or means).

The control portion 16 to perform S250 and S235 can correspond to an example of a route transmission portion (or means).

The map information input/output portion 22 of the navigation device 20 can correspond to an example of a map acquisition portion (or means) in the navigation device 20. The control portion 28 to perform S105 can correspond to an example of a point transmission portion (or means). The control portion 28 to perform S120 can correspond to an example of a map reception portion (or means). The control portion 28 to perform S135 can correspond to an example of a route computation portion (or means). The control portion 28 to perform S140 can correspond to an example of a route guidance portion (or means).

A center device according to a first example as an embodiment of the present disclosure includes the map acquisition portion, the first route computation portion, the available map specification portion, the second route computation portion, the transmission map specification portion, and the map transmission portion. The map acquisition portion acquires map information. The first route computation portion computes a route from a guidance start point to a guidance end point (hereinafter referred to as a "center route") based on the latest map information acquired by the map acquisition portion and the information about the guidance start point and the guidance end point received from the navigation device. The available map specification portion specifies map information that is acquired by the map acquisition portion and is available to the navigation device. The second route computation portion computes a route from a guidance start point to a guidance end point (hereinafter referred to as a "navigation route") based on the map information specified by the available map specification portion and the information about the guidance start point and the guidance end point received from the navigation device. The transmission map specification portion specifies difference map information that is contained in the map information acquired by the map acquisition portion and is needed for the navigation device to guide the center route. The transmission map specification portion specifies the difference map information based on the center route and the navigation route. The map transmission portion transmits the map information specified by the transmission map specification portion to the navigation device.

According to this center device, the navigation device can guide a route comparable to the route computed based on the latest map information available to the center device while minimizing map information transmitted from the center device to the navigation device (restraining a load on the communication network).

The transmission map specification portion may favorably specify map information corresponding to a difference in the center route from the navigation route as the difference map information needed to guide the center route. It may be favorable to specify the map information about a difference (link sequence) on the center route out of differences between the center route and the navigation route.

Specifying the map information to be transmitted to the navigation device as described above can increase the possibility of a match between a route computed based on the map information maintained in the navigation device and a route computed based on the latest map information available to the center device.

When the transmission map specification portion specifies the map information, the second route computation portion re-computes the navigation route in association with the map information. When the re-computed navigation route differs from the already computed center route, the transmission map specification portion may favorably specify map information corresponding to a difference in the re-computed navigation route from the center route as the difference map information needed to guide the center route. It may be favorable to specify the map information about a difference (link sequence) on the navigation route out of differences between the center route and the navigation route.

Specifying the map information to be transmitted to the navigation device as described above can further increase the possibility of a match between a route computed based on the map information maintained in the navigation device and a route computed based on the latest map information available to the center device.

Each time the transmission map specification portion specifies the map information, the second route computation portion re-computes the navigation route in association with the map information. The transmission map specification portion may favorably further specify map information corresponding to a difference in the re-computed navigation route from the center route as the difference map information needed to guide the center route until the re-computed navigation route matches the already computed center route.

Specifying the map information to be transmitted to the navigation device as described above can further increase the possibility of a match between a route computed based on the map information maintained in the navigation device and a route computed based on the latest map information available to the center device.

The navigation device may receive the map information transmitted from the center device and then compute a route in itself or may receive a route from the center device for guidance. In other words, the center device may further include the route transmission portion that transmits route information capable of specifying the center route to the navigation device.

According to this center device, the navigation device need not compute a route. The corresponding function of the navigation device can be eliminated.

The center device according to a second example of the disclosure includes the map acquisition portion, the first route computation portion, the available map specification portion, the transmission map specification portion, and the map transmission portion. The map acquisition portion acquires map information. The first route computation portion computes a route from a guidance start point to a guidance end point (hereinafter referred to as a "center route") based on the latest map information acquired by the map acquisition portion and the information about the guidance start point and the guidance end point received from the navigation device. The available map specification portion specifies map information that is acquired by the map acquisition portion and is available to the navigation device. The transmission map specification portion specifies difference map information that is contained in the map information acquired by the map acquisition portion and is needed for the navigation device to guide the center route. The transmission map specification portion specifies the difference map information based on the map information specified by the available map specification portion and the latest map information about the vicinity of the center route. The map transmission portion transmits the map information specified by the transmission map specification portion to the navigation device.

The above-mentioned center device may further include the route transmission portion (16, S250, S235) that transmits route information capable of specifying the center route to the navigation device.

In the above-mentioned center device, the map information may contain the road attribute information.

In the above-mentioned center device, the map information may contain at least one of the road regulation information and the traffic congestion information.

A third example of the disclosure provides a map information transmission method that is performed by one or several computers and includes the following steps. A map acquisition step acquires map information. A first route computation step computes a route from a guidance start point to a guidance end point as a center route based on the latest map information acquired by the map acquisition step and the guidance start point and the guidance end point received from the navigation device. An available map specification step specifies map information that is acquired by the map acquisition step and is available to the navigation device. A second route computation portion computes a route from a guidance start point to a guidance end point as a navigation route based on the map information specified by the available map specification step and the guidance start point and the guidance end point received from the navigation device. A transmission map specification step specifies difference map information that is contained in the map information acquired by the map acquisition step and is needed for the navigation device to guide the center route. The transmission map specification step specifies the difference map information based on the center route and the navigation route. A map transmission step transmits the map information specified by the transmission map specification step to the navigation device.

According to this map information transmission method, the navigation device can guide a route comparable to the route computed based on the latest map information available to the center device while minimizing map information transmitted to the navigation device (restraining a load on the communication network).

A fourth example of the disclosure provides a map information transmission method that is performed by one or several computers and includes the following steps. A map acquisition step acquires map information. A first route computation step computes a route from a guidance start point to a guidance end point as a center route based on the latest map information acquired by the map acquisition step and the information about the guidance start point and the guidance end point received from the navigation device. An available map specification step specifies map information that is acquired by the map acquisition step and is available to the navigation device. A transmission map specification step specifies difference map information that is contained in the map information acquired by the map acquisition step and is needed for the navigation device to guide the center route. The transmission map specification step specifies the difference map information based on the map information specified by the available map specification step and the latest map information about the vicinity of the center route. A map transmission step transmits the map information specified by the transmission map specification step to the navigation device.

According to this map information transmission method, the navigation device can guide a route comparable to the route computed based on the latest map information available to the center device while minimizing map information transmitted to the navigation device (restraining a load on the communication network).

A fifth example of the disclosure provides a navigation device that communicates with the above-mentioned center device and includes the following. A map acquisition portion acquires map information from a map storage portion that stores map information. A point transmission portion transmits information about a guidance start point and a guidance end point concerning route guidance to the center device. A map reception portion receives map information from the center device. A route computation portion computes a route from the guidance start point to the guidance end point based on the map information acquired by the map acquisition portion and map information received by the map reception portion. A route guidance portion provides route guidance based on the map information acquired by the map acquisition portion, map information received by the map reception portion, and the route computed by the route computation portion.

According to this navigation device, the navigation device can guide a route comparable to the route computed based on the latest map information available to the center device while minimizing map information transmitted from the center device to the navigation device (restraining a load on the communication network).

While there have been exemplified the embodiments and configurations according to the present disclosure, embodiments and configurations according to the disclosure are not limited to the above-mentioned embodiments and configurations. The scope of the embodiments and configurations according to the disclosure also includes embodiments and configurations resulting from appropriately combining different embodiments and configurations with the disclosed technical elements.

The invention claimed is:

1. A center device comprising:
   a map acquisition portion that acquires a plurality of map information;
   a first route computation portion that computes a route from a guidance start point to a guidance end point as a center route based on latest map information out of the plurality of map information acquired by the map acquisition portion and based on information about the guidance start point and the guidance end point received from a navigation device;
   an available map specification portion that specifies map information available to the navigation device from among the plurality of map information acquired by the map acquisition portion;
   a second route computation portion that computes a route from the guidance start point to the guidance end point as a navigation route based on the map information specified by the available map specification portion and based on the information about the guidance start point and the guidance end point received from the navigation device; and
   a transmission map specification portion that, based on the center route and the navigation route, specifies difference map information which is needed for the navigation device to guide the center route out of a difference between the plurality of map information acquired by the map acquisition portion and witch corresponds to a difference between the center route and the navigation route,
   wherein
   when the transmission map specification portion specifies the difference map information, the second route computation portion re-computes a route from the guidance start point to the guidance end point as a re-computed navigation route based on the map information specified by the available map specification portion by taking into account the specified difference map information and determines whether the re-computed navigation route differs from the center route; and
   when it is determined that the re-computed navigation route differs from the center route, the transmission map specification portion specifies map information that corresponds to a difference between the re-computed navigation route and the center route as the difference map information, further comprising a map transmission portion that transmits the map information specified by the transmission map specification portion to the navigation device.

2. The center device according to claim 1, wherein:
each time the transmission map specification portion specifies the map information, the second route computation portion re-computes the navigation route by taking into account the specified map information; and
the transmission map specification portion further specifies map information corresponding to a difference between the re-computed navigation route and the center route as the difference map information until the re-computed navigation route matches the center route.

3. The center device according to claim 1, further comprising:
a route transmission portion that transmits route information capable of specifying the center route to the navigation device.

4. The center device according to claim 1, wherein:
the map information includes road attribute information.

5. The center device according to claim 1, wherein:
the map information includes at least one of road regulation information and traffic congestion information.

6. A tangible non-transitory storage medium storing a program that causes a computer to function as
a map acquisition portion that acquires a plurality of map information;
a first route computation portion that computes a route from a guidance start point to a guidance end point as a center route based on latest map information out of the plurality of map information acquired by the map acquisition portion and based on information about the guidance start point and the guidance end point received from a navigation device;
an available map specification portion that specifies map information available to the navigation device from among the plurality of map information acquired by the map acquisition portion;
a second route computation portion that computes a route from the guidance start point to the guidance end point as a navigation route based on the map information specified by the available map specification portion and based on the information about the guidance start point and the guidance end point received from the navigation device; and
a transmission map specification portion that, based on the center route and the navigation route, specifies difference map information which is needed for the navigation device to guide the center route out of a difference between the plurality of map information acquired by the map acquisition portion and which corresponds to a difference between the center route and the navigation route,
wherein
when the transmission map specification portion specifies the difference map information, the second route computation portion re-computes a route from the guidance start point to the guidance end point as a re-computed navigation route based on the map information specified by the available map specification portion by taking into account the specified difference map information and determines whether the re-computed navigation route differs from the center route; and
when it is determined that the re-computed navigation route differs from the center route, the transmission map specification portion specifies map information that corresponds to a difference between the re-computed navigation route and the center route as the difference map information, further comprising a map transmission portion that transmits the map information specified by the transmission map specification portion to the navigation device.

7. The tangible non-transitory storage medium according to claim 6, wherein:
each time the transmission map specification portion specifies the map information, the second route computation portion re-computes the navigation route by taking into account the specified map information; and
the transmission map specification portion further specifies map information corresponding to a difference between the re-computed navigation route and the center route as the difference map information until the re-computed navigation route matches the center route.

8. A map information transmission method performed by one or a plurality of computers, comprising:
in a map acquisition step, acquiring a plurality of map information;
in a first route computation step, computing a route from a guidance start point to a guidance end point as a center route based on latest map information out of the plurality of map information acquired in the map acquisition step and based on information about the guidance start point and the guidance end point received from a navigation device;
in an available map specification step, specifying map information available to the navigation device from among the plurality of map information acquired in the map acquisition step;
in a second route computation step, computing a route from the guidance start point to the guidance end point as a navigation route based on the map information specified in the available map specification step and the guidance start point and the guidance end point received from the navigation device; and
in a transmission map specification step, based on the center route and the navigation route, specifying difference map information that is needed for the navigation device to guide the center route out of a difference between the plurality of map information acquired by the map acquisition step and which corresponds to a difference between the center route and the navigation route,
wherein
when the transmission map specification steps specifies the difference map information, the second route computation step re-computes a route from the guidance start point to the guidance end point as a re-computed navigation route based on the map information specified by the available map specification step by taking into account the specified difference map information and determines whether the re-computed navigation route differs from the center route; and
when it is determined that the re-computed navigation route differs from the center route, the transmission map specification step specifies map information that corresponds to a difference between the re-computed navigation route and the center route as the difference map information, further comprising in a map transmission step, transmitting the map information specified in the transmission map specification step to the navigation device.

9. The map information transmission method according to claim 8, wherein:
each time the transmission map specification step specifies the map information, the second route computation step re-computes the navigation route by taking into account the specified map information; and the transmission map specification step further specifies map information corresponding to a difference between the re-computed navigation route and the center route as the difference map information until the re-computed navigation route matches the center route.

10. A navigation device communicating with a center device, the center device comprising:
- a map acquisition portion that acquires a plurality of map information;
- a first route computation portion that computes a route from a guidance start point to a guidance end point as a center route based on latest map information out of the plurality of map information acquired by the map acquisition portion and based on information about the guidance start point and the guidance end point received from a navigation device;
- an available map specification portion that specifies map information available to the navigation device from among the plurality of map information acquired by the map acquisition portion;
- a second route computation portion that computes a route from the guidance start point to the guidance end point as a navigation route based on the map information specified by the available map specification portion and based on the information about the guidance start point and the guidance end point received from the navigation device; and
- a transmission map specification portion that, based on the center route and the navigation route, specifies difference map information which is needed for the navigation device to guide the center route out of a difference between the plurality of map information acquired by the map acquisition portion and which corresponds to a difference between the center route and the navigation route, wherein when the transmission map specification portion specifies the difference map information, the second route computation portion re-computes a route from the guidance start point to the guidance end point as a re-computed navigation route based on the map information specified by the available map specification portion by taking into account the specified difference map information and determines whether the re-computed navigation route differs from the center route; and when it is determined that the re-computed navigation route differs from the center route, the transmission map specification portion specifies map information that corresponds to a difference between the re-computed navigation route and the center route as the difference map information, further comprising
- a map transmission portion that transmits the map information specified by the transmission map specification portion to the navigation device;

the navigation device comprising:
- a map acquisition portion that acquires map information from a map storage portion storing the map information;
- a point transmission portion to transmit information about the guidance start point and the guidance end point concerning route guidance to the center device;
- a map reception portion that receives the map information from the center device;
- a route computation portion that computes a route from the guidance start point to the guidance end point based on the map information acquired by the map acquisition portion and the map information received by the map reception portion; and
- a route guidance portion that provides route guidance based on the map information acquired by the map acquisition portion, the map information received by the map reception portion, and the route computed by the route computation portion.

11. The navigation device communicating with the center device, according to claim 10, wherein:

each time the transmission map specification portion specifies the map information, the second route computation portion re-computes the navigation route by taking into account the specified map information; and the transmission map specification portion further specifies map information corresponding to a difference between the re-computed navigation route and the center route as the difference map information until the re-computed navigation route matches the center route.

\* \* \* \* \*